Aug. 7, 1956
A. K. OZAI-DURRANI
2,757,924
MEANS FOR MEASURING WEIGHT
Filed Jan. 9, 1952
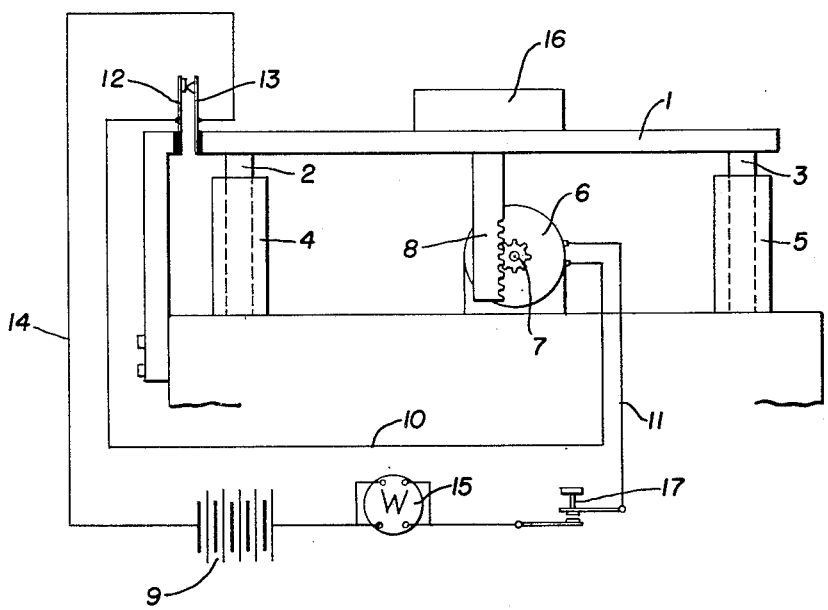
INVENTOR.
ATAULLAH·K. OZAI-DURRANI
BY
E.C. Sanborn
ATTORNEY

United States Patent Office 2,757,924

Patented Aug. 7, 1956

2,757,924
MEANS FOR MEASURING WEIGHT

Ataullah K. Ozai-Durrani, Stuttgart, Ark.

Application January 9, 1952, Serial No. 265,678

4 Claims. (Cl. 265—70)

The weight of a body is measured by the force exerted upon it by gravity, i. e., $W=mg.$, where $W=$weight, $m=$mass, and $g$ the acceleration due to gravity.

In other words, the weight of a body is the force exerted upon it by the earth's gravitational attraction. When c. g. s. units are used this force is 980 times the mass of the body. In other words, the weight of one gram, in c. g. s. units, is 980 dynes.

The present invention provides for measuring weight in terms of the electrical energy required to lift a mass vertically through a slight distance, from a state of rest to a state of suspension, just sufficient to overcome its inertia. For instance the electrical energy required to lift the mass through one centimeter may be measured. Since energy equals force times distance, and the distance is unity, the energy is a measure of the force, or weight of the object.

The invention avoids the need for counterweights and springs such as are employed in weighing apparatus heretofore used, and attains marked accuracy and precision of weighing in a particularly simple and advantageous manner.

Other features and advantages of the invention will be hereinafter described and claimed.

In the accompanying drawings there is shown a diagrammatic view of one form of means whereby the invention may be carried out.

Referring to the drawing, there is shown at 1 a platform movable vertically and supported for vertical movement for negligible friction in any suitable manner as through guide plungers 2, 3, movable in stationary cylinders 4, 5. The platform is adapted to be moved vertically through a slight distance by means of an electric motor 6 having on its shaft a pinion 7 engaging a rack 8 affixed to and depending from the platform. The motor terminals are connected to any suitable source of electromotive source 9 through conductors 10, 11. Conductor 10 is connected to a stationary contact 12 which is engaged by a contact 13 on the platform 1 when the platform is in its lowermost position. From the contact 13 a conductor 14 leads to one terminal of the source 9. The opposite terminal of said source is connected to the conductor through a recording wattmeter 15 of any conventional type. The mass 16, the weight of which is to be determined, is placed upon the platform 1 and the hand switch 17 in the conductor 11 is closed thereby energizing the motor 6 and raising the platform 1 and mass 16 through any predetermined slight distance, for example one centimeter or less. When the platform and mass aforementioned are raised through said distance the contact 13 is disengaged from the contact 12 and the circuit through the motor is broken. The wattmeter 15 records on its chart the electrical energy expended in raising the platform and mass 16 through said distance, thereby giving a measure of the weight of the mass 16. In this connection, it will be apparent that the energy necessary to raise the platform 1 alone through the aforementioned distance may be previously determined and appropriately deducted from the total energy required to raise the platform 1 and mass 16 through said distance. To that end the wattmeter chart may be appropriately calibrated.

It will thus be seen that through this invention a particularly accurate determination of weight is possible without the need for balancing springs or counterweights. The recording of the energy on the wattmeter chart enables an especially high degree of precision and accuracy to be obtained.

If desired, in lieu of a recordnig chart associated with the wattmeter, there may be employed a photographic film in front of a disk rotated by said wattmeter, said disk having around its face a series of successive holes in the form of numerals, indicating successive values of watts. Behind the disk there may be mounted a light source, which, when energized, directs light on to the film through the particular opening in the disk which is opposite said source, thereby photographically recording the wattage derived from said wattmeter. Said light source may be energized through contacts closed when the platform and weight are raised through a predetermined distance, or, alternatively, a shutter normally obscuring a constantly-energized light source may be removed from its obscuring position when said contacts are closed. Instead of numerals punched through said disk, the disk may be transparent, with opaque numerals, or vice versa.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Weight determining apparatus comprising means for supporting a mass to be measured, means for applying electrical energy to the movement of said mass through a predetermined slight distance just sufficient to overcome its inertia, means for terminating said predetermined movement by discontinuing the application of electrical energy after said predetermined movement, and means for measuring the amount of said energy.

2. In combination means for supporting an object for the determination of its weight, an electric motor for moving said supporting means through a slight, fixed predetermined distance just sufficient to overcome the inertia of said supporting means and said object, means operable automatically upon movement of said supporting means through said distance for deenergizing said motor, and means for measuring the electrical energy applied to said motor.

3. Weight determining apparatus comprising means for supporting a mass to be measured, means for applying electrical energy to the vertical movement of said mass through a predetermined slight distance just sufficient to overcome its inertia, means for terminating said predetermined movement by discontinuing the application of electrical energy after said predetermined movement, and means for measuring the amount of said energy.

4. Weight determining apparatus comprising a platform for supporting a mass to be measured, an electric motor for lifting said platform through a slight, fixed predetermined distance from a state of rest to a state of suspension not substantially greater than necessary to overcome its inertia, means for automatically deenergizing said motor upon lifting of said platform through said distance, and a recording wattmeter for measuring the electrical input to said motor while said motor is lifting said platform with said mass thereon.

References Cited in the file of this patent

UNITED STATES PATENTS

| | | |
|---|---|---|
| 1,298,302 | Davis | Mar. 25, 1917 |
| 1,669,519 | Hild | May 15, 1928 |
| 1,942,920 | Fawkes | Jan. 9, 1934 |
| 2,305,783 | Heymann et al. | Dec. 22, 1942 |
| 2,600,966 | Carrier | June 17, 1952 |
| 2,623,636 | Pounds | Dec. 30, 1952 |

OTHER REFERENCES

Publication: Link-Belt Co., Catalog #800, page 1052, published 1939 (Copy in Div. 4.)